United States Patent [19]

Sanchelima

[11] Patent Number: 6,015,579
[45] Date of Patent: Jan. 18, 2000

[54] PROCESS FOR ENHANCING THE INCORPORATION OF WHEY PROTEINS IN THE CHEESE CURD

[76] Inventor: Juan A. Sanchelima, 1783 N.W. 93rd Ave., Miami, Fla. 33172

[21] Appl. No.: 09/138,344

[22] Filed: Aug. 21, 1998

Related U.S. Application Data

[63] Continuation-in-part of application No. 08/961,678, Oct. 31, 1997, Pat. No. 5,901,740.

[51] Int. Cl.⁷ ..................................................... A23C 9/12
[52] U.S. Cl. ................................ 426/36; 426/34; 426/38; 426/580; 426/582
[58] Field of Search ................................ 426/582, 34, 36, 426/38, 42, 580, 518

[56] References Cited

U.S. PATENT DOCUMENTS

| | | | |
|---|---|---|---|
| 4,851,238 | 7/1989 | Bussiere et al. | 426/39 |
| 4,919,944 | 4/1990 | Bussiere et al. | 426/39 |
| 5,532,018 | 7/1996 | Miller et al. | 426/582 |
| 5,554,398 | 9/1996 | Chen et al. | 426/36 |
| 5,901,740 | 5/1999 | Sanchelima | 137/392 |

*Primary Examiner*—Leslie Wong
*Attorney, Agent, or Firm*—J. Sanchelima

[57] ABSTRACT

A process for enhancing the incorporation of seric or whey protein in the cheese curd to be used in a continuous flow method for producing cheese. The process includes the steps of raising the temperature to between 75 and 85 degrees centigrade for a period of time that could vary from 10 minutes to 30 minutes. Subsequently, the temperature of the milk is lowered and maintained between 38 and 48 degrees centigrade for the rest of the process. The next step involves the addition of a coagulation agent at a rate of between 20 and 40 percent more than what is conventionally used. The resulting curd is then cut in relatively small pieces to increase its effective surface area. Then, the next step involves the addition of calcium chloride at a rate that is between 150 and 190 percent above (or 2.5 to 2.9 times) the used amount used. The curd is then finally drained and molded.

4 Claims, 1 Drawing Sheet

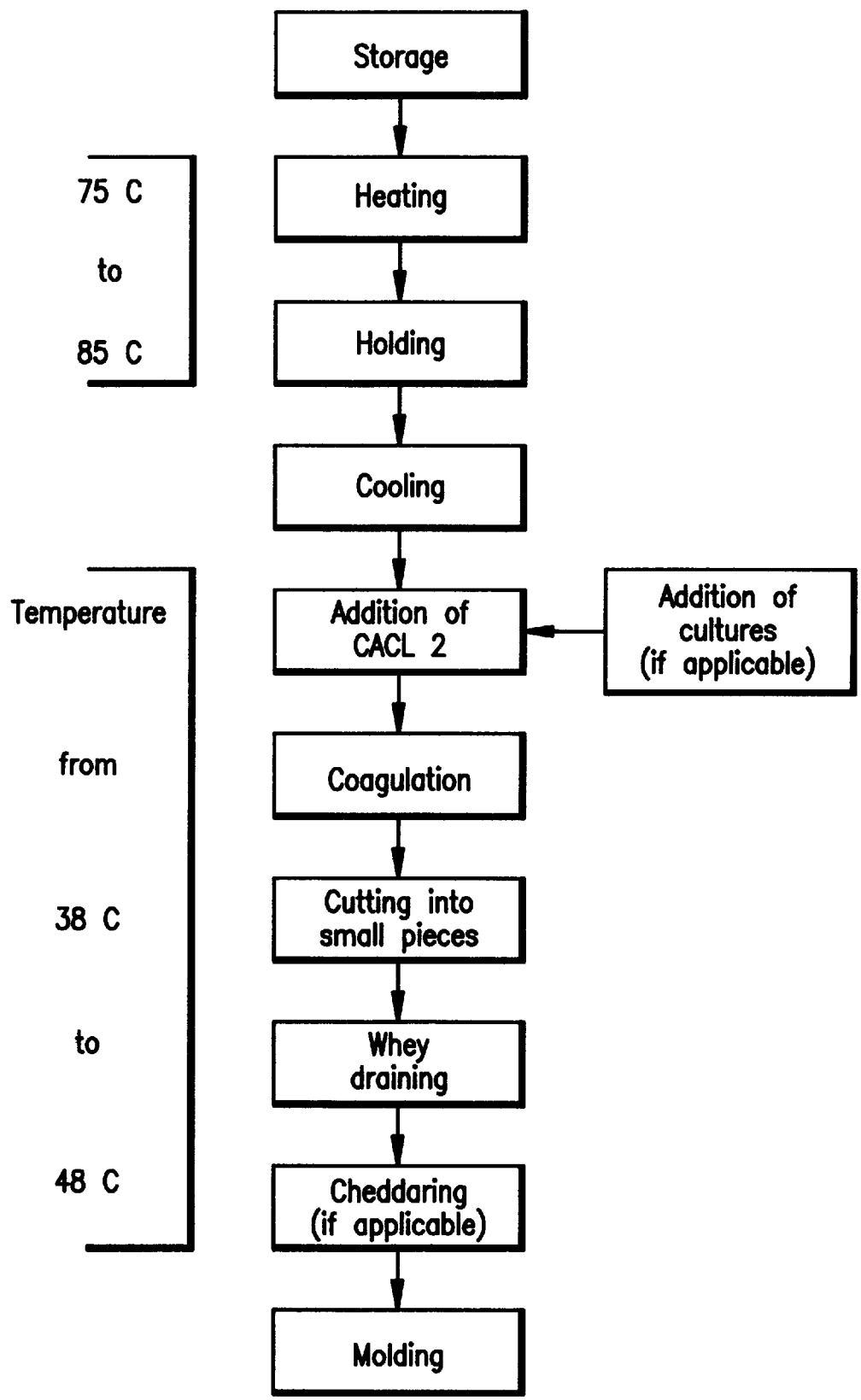

PROCESS FOR ENHANCING THE INCORPORATION OF WHEY PROTEINS IN THE CHEESE CURD

OTHER RELATED APPLICATIONS

The present application is a continuation-in-part of U.S. patent application Ser. No. 08/961,678 filed on Oct. 31, 1997 now U.S. Pat. No. 5,901,740, which is hereby incorporated by reference.

BACKGROUND OF THE INVENTION

1. Field of the Invention

The present invention relates to a process for enhancing the incorporation of whey proteins in a continuous flow processing of milk.

2. Description of the Related Art

The processing of milk, requires inter alia exposure to predetermined temperatures over a given time period. For pasteurizing milk, for example, in a modern continues flow process the milk is typically exposed to a relatively high temperature (72° to 75° C.) for a relatively short time (16 seconds). And this is referred to as the HTST (High Temperature Short Time) method.

Another method for pasteurizing milk is known as the LTH (Low Temperature Long Time) method wherein the milk is held for 30 minutes at a relatively lower temperature of 63–65° C. Both processes have their advantages and disadvantages.

The longer holding time of the latter method, however, makes it impractical for use in continues flow processes since it would require an extraordinarily long conduit. Thus, the desirability of having a device that can provide a variable (and capable of achieving a relatively long holding time) holding time in a continuous flow environment. Furthermore, it is also desirable that this device be capable of readily changing the holding time as required or desired. The present invention provides the user with this flexibility permitting the immediate adjustment of holding times to achieve the projected output characteristics.

The closest reference known to the holding tank element in applicant's process corresponds to German patent No. 343,889 issued in 1921.

Basically, the heating unit of the foreign patentee utilizes chambers with smaller diameters (for faster flow) where the milk rises to prevent the heavier solids from separating.

The only concern in that patented invention was to mechanically prevent the settlement of the heavier particles. In the present invention there is no preferential flow and the milk follows the first in, first out rule. More important, the foreign patent does not disclose level sensors or any other mechanisms for changing the holding time. With respect to the method claimed in the present application, there is no suggestion of the process steps claimed herein nor the use of a coagulation agent or calcium chloride in the manner and proportions claimed in the present invention.

SUMMARY OF THE INVENTION

It is one of the main objects of the present invention to increase the yield in the production of cheese by enhancing the precipitation of whey proteins and their capture in the resulting curd.

It is another object of this invention to provide a process that is compatible with a continuous flow process that ensures the non-preferential flow of the milk.

It is still another object of the present invention to provide a process that is economically attractive in the production of cheese to enhance the yield.

It is another object of this invention to provide a process that can readily vary the amounts of holding time in a continuous flow process of milk depending on the yield being obtained.

It is another object of this invention to provide a process that includes the capability of varying the holding time and maximizing the yield of precipitating whey proteins at higher than conventional pasteurization temperature.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is a block diagram showing the process steps.

DETAILED DESCRIPTION OF THE PREFERRED EMBODIMENT

It has been found that in making cheese the production yield is increased if the otherwise soluble whey proteins are caused to lose their solubility (denature) and allowed to join the casein curd. To accomplish this in a continious flow milk process, the temperature needs to be maintained within a certain range for a predetermined time periods. In one of the contemplated methods for practicing the invention, the first step is for the milk needs to be kept at a temperature between 75 and 85 degrees centigrade for a period of time that could be between 10 and 30 minutes, in order to provoke the denaturation of the milk serum or whey proteins.

The temperature of the milk is raised by passing it through heat exchanges. The milk is brought to a temperature between 75 and 85 degrees centigrade. Then, it is held in a non-preferential flow tank, with first in-first out capabilities, for a period of time that may vary from 10 minutes to 30 minutes. The optimum being 80 degrees centigrade for 12 minutes for fresh curds. The milk temperature is then lowered to between 38 and 48 degrees centigrade (depending on final moisture desired) and it is ripen by adding a starter, such as mesophilic or thermophilic lactic cultures. The amount of starter used is the conventional amount for each type of cheese.

A coagulation agent, such as rennet chymosin, is then added to the milk. For chymosin, the proportion that may vary from 50 ml/1000 liters to 60 ml/1000 liters, obtaining the best results at approximately 54 milliliters per 1000 liters of milk. One of the chymosin products that can be used is Chy-Max, a registered mark of Hansen Laboratories, Inc. Madison, Wis.

The chymosin strength is 1:50,000. The typical process uses from 44–46 ml. per/1000 liters. Therefore, the present invention contemplates using more coagulation agent, approximately 22% more, to improve coagulation effect on casein protein. The resulting curd is then cut in small pieces of approximately 0.5 cm in average diameter augment its effective surface area.

Before coagulation calcium chloride is then added to the curd mass at this point in the following proportions: 400 to 440 grams per 1000 liters of milk used. The Calcium chloride used is the granulated food grade 94.5% purity type. The best results are obtained at 420 grams per 1000 liters. Typically, only 150–170 grams per 1000 liters is used.

Therefore, the present invention uses approximately 150 to 190% more than what is conventionally used.

The resulting curds are drained. The use of conventional draining assemblies hereby removing the whey. At this point, if desired, a user undertakes the cheddaring process step as it is conventionally known.

The curds are molded in molds maintaining the temperature between 38 and 45 degrees centigrade. Then, depending on the type of cheese, the curd may be turned over to shape it or press it. Since the objective of this process is for the curd to capture whey protein that would otherwise have been wasted in the whey, then this added protein must be taken into consideration to keep the protein/fat ratio as desired. This ratio is what characterizes the resulting cheese. Therefore, if a user desires to maintain the ratio constant, he or she needs to compensate by increasing proportionally the fat content of the milk being used. In the typical curd producing process, the milk protein includes 80% of casein and 20% of whey protein. Most of the whey protein is dissolved and lost with the whey along with other substances, such as lactose fat and minerals. It has been found that the whey protein amounts to 11% of the whey solids, using conventional methods.

On the other hand, using the process subject of the present invention the applicant has obtained only 8.5 to 9.0% of the solid as whey protein. The difference being obviously kept by the curd mass. This is an absorption increase of whey protein of approximately 23%. Therefore, if the protein/fat ratio is to be kept constant, for a given type of cheese characteristics, then the fat content should be proportionately increased. For example, if in a conventional process milk with 3.0% fat is used, we know that the curd will have 80% of the total protein content (most of it casein). The other 20% is wasted. When 23% of this 20% is captured, that means that the total protein captured will be increased by 4.6% (23% times 20%). Therefore, 3.0 is to 80%

X is to 84.6%

X=(84.6/80) 3.0=3.17 then the milk fat needs to be adjusted to 3.17 percent to keep the same protein/fat ratio.

What is claimed is:

1. A process for making cheese curd, comprising:
    A) raising the temperature of the milk to a temperature between 75 degrees centigrade and 85 degrees centigrade for a period of time not less than 10 minutes and not more than 30 minutes;
    B) lower the temperature of the milk to between 38 degrees centigrade and 48 degrees centigrade;
    C) coagulating the milk by adding a coagulation agent at a rate between 50 and 60 ml. per 1000 liters of milk;
    D) cutting the curd in small pieces so that the effective surface area is increased to maximize the adhesion of whey protein to the curd;
    E) adding calcium chloride to the milk between 400 and 440 grams per 1000 liters and the calcium chloride being granulated food grade type at 94.5% purity;
    F) draining the resulting curd; and
    G) molding the resulting curd pieces maintaining the temperature between 38 degrees centigrade and 48 degrees centigrade.

2. The process set forth in claim 1 wherein the temperature in step A, above, is raised to approximately 80 degrees centigrade for approximately 12 minutes.

3. The process set forth in class 2 wherein the coagulation agent used in chymosin.

4. The process set forth in claim 3 wherein the chymosin is used at a rate between 50 and 60 milliliters per thousand liters of milk and the strength being 1:50,000.

* * * * *